(12) United States Patent
Imada

(10) Patent No.: US 8,712,178 B2
(45) Date of Patent: Apr. 29, 2014

(54) IMAGE PROCESSING APPARATUS AND IMAGE PROCESSING METHOD

(75) Inventor: Kei Imada, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 13/356,272

(22) Filed: Jan. 23, 2012

(65) Prior Publication Data

US 2012/0269453 A1  Oct. 25, 2012

(30) Foreign Application Priority Data

Apr. 25, 2011  (JP) .................................. 2011-097475

(51) Int. Cl.
  *G06K 9/40*  (2006.01)
(52) U.S. Cl.
  USPC ........................................................ 382/254
(58) Field of Classification Search
  USPC .......... 348/208.4, 208.6, 308.13, 352, 431.1,
    348/451, 452, 620, E7.007; 375/E7.1,
    375/E7.031, E7.25, E7.256, E7.104,
    375/E7.114, E7.116; 382/107, 236, 254
  See application file for complete search history.

(56) References Cited

U.S. PATENT DOCUMENTS

| | | | |
|---|---|---|---|
| 2005/0069212 A1 | 3/2005 | Bottreau et al. | |
| 2006/0013306 A1 | 1/2006 | Kim et al. | |
| 2007/0053431 A1 | 3/2007 | Cammas et al. | |
| 2010/0245672 A1 * | 9/2010 | Erdler et al. ................. | 348/608 |

FOREIGN PATENT DOCUMENTS

| | | |
|---|---|---|
| JP | 2005-513925 | 5/2005 |
| JP | 2006-521048 | 9/2006 |
| JP | 2008-507194 | 3/2008 |
| JP | 2008-310117 | 12/2008 |

OTHER PUBLICATIONS

Japanese Patent Application No. 2011-097475, Notification of Reasons for Refusal, mailed May 15, 2013, (with English Translation).

* cited by examiner

*Primary Examiner* — Gregory F Cunningham
(74) *Attorney, Agent, or Firm* — Blakely, Sokoloff, Taylor & Zafman LLP

(57) ABSTRACT

According to one embodiment, an image processing apparatus includes: an acquisition module configured to acquire a moving image configured by a plurality of frames; an estimation module configured to estimate an amount of motion of a processing frame in the moving image with respect to a reference frame other than the processing frame in the moving image; a fine image generator configured to produce a generated fine image serving as a fine image of the processing frame by performing, according to the amount of motion, motion compensation on a fine image by increasing a spatial frequency of texture components included in the reference frame; and a combining module configured to combine the processing frame and the generated fine image, wherein the fine image generator puts a limit to an interval between the reference frame in a future direction and the processing frame.

8 Claims, 5 Drawing Sheets

IMAGE PROCESSING APPARATUS AND IMAGE PROCESSING METHOD

CROSS REFERENCE TO RELATED APPLICATION(S)

The application is based upon and claims the benefit of priority from Japanese Patent Application No. 2011-097475 filed on Apr. 25, 2011, the entire contents of which are incorporated herein by reference.

BACKGROUND

1. Field

Embodiments of the present invention relate to an image processing apparatus and an image processing method.

2. Description of the Related Art

Digital television broadcasting has started, so that resolution and image quality have been enhanced, as compared with conventional analog broadcasting. To further improve the image quality, the enhancement of a feel of fineness is important.

There is a related technique that is described in Patent Document 1 (JP 2008-310117-A) as that for enhancing the feel of fineness. This technique is such that texture components extracted from an input image are reduced in size to generate fine texture components, and that the feel of fineness of images is enhanced, as compared with conventional techniques, can be enhanced by combining the fine texture components with the input image.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

According to one embodiment, an image processing apparatus includes: an acquisition module configured to acquire a moving image configured by a plurality of frames; an estimation module configured to estimate an amount of motion of a processing frame in the moving image with respect to a reference frame other than the processing frame in the moving image; a fine image generator configured to produce a generated fine image serving as a fine image of the processing frame by performing, according to the amount of motion, motion compensation on a fine image by increasing a spatial frequency of texture components included in the reference frame; and a combining module configured to combine the processing frame and the generated fine image, wherein the fine image generator puts a limit to an interval between the reference frame in a future direction and the processing frame.

Hereinafter, an embodiment of the invention is described.

Figure 1:
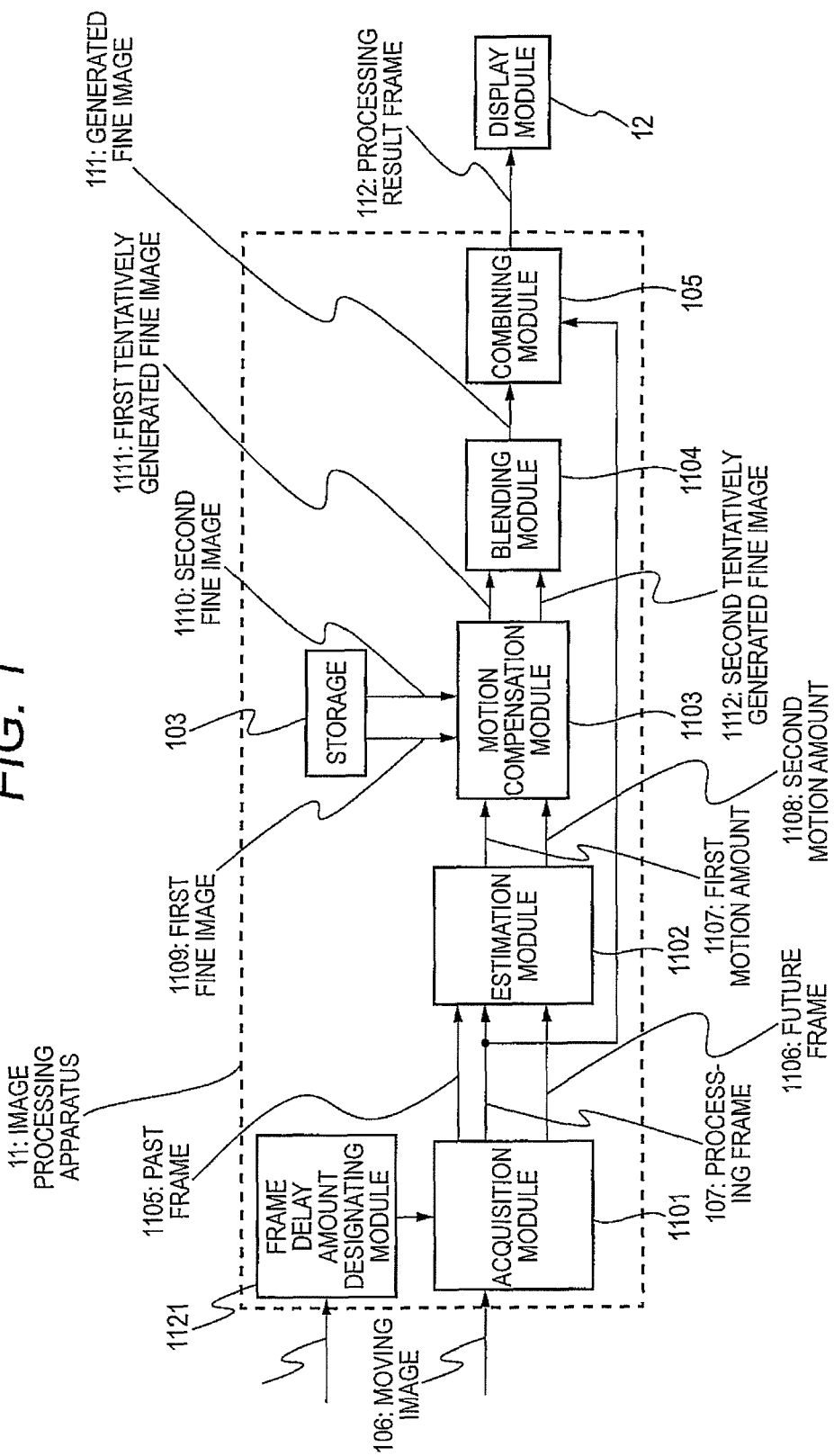
FIG. 1 is a block diagram illustrating the configuration of an embodiment of the invention, which includes an image processing apparatus 11.

FIG. 1 is a block diagram illustrating the configuration of an image processing apparatus 11 according to the present embodiment of the invention. The image processing apparatus 11 includes an acquisition module 1101, an estimation module 1102, a motion compensating module 1103, a blending module 1104, a storage portion 103, a combining module 105, and a frame delay amount designating module 1121. The present embodiment is configured such that an output of the combining module 105 is led to and displayed in a display module 12 configured by a liquid crystal panel or the like. The display unit 12 can be configured to be included in the image processing apparatus 11.

The image processing apparatus 11, to which a moving image 106 is input, outputs a processing result frame 112 subjected to image quality enhancement processing and flicker suppression processing. The processing result frame 112 represents a result of the image quality enhancement processing and the flicker suppression processing performed on a given frame (current frame) in the moving image 106.

The acquisition module 1101 reads from the moving image 106 a given processing frame 107, a past frame 1105 that is present at a previous time prior to a given time at which the processing frame 107 is present, and a future frame 1106 that is present at a later time subsequent to the given time at which the processing frame 107 is present. The previous time is not limited to a moment immediately prior to the given time. The later time is not limited to a moment immediately subsequent to the given time.

The estimation module 1102 estimates a first movement amount 1107 from the processing frame 107 and the past frame 1105. The estimation module 1102 also estimates a second movement amount 1108 from the processing frame 107 and the future frame 1106.

Figure 2:
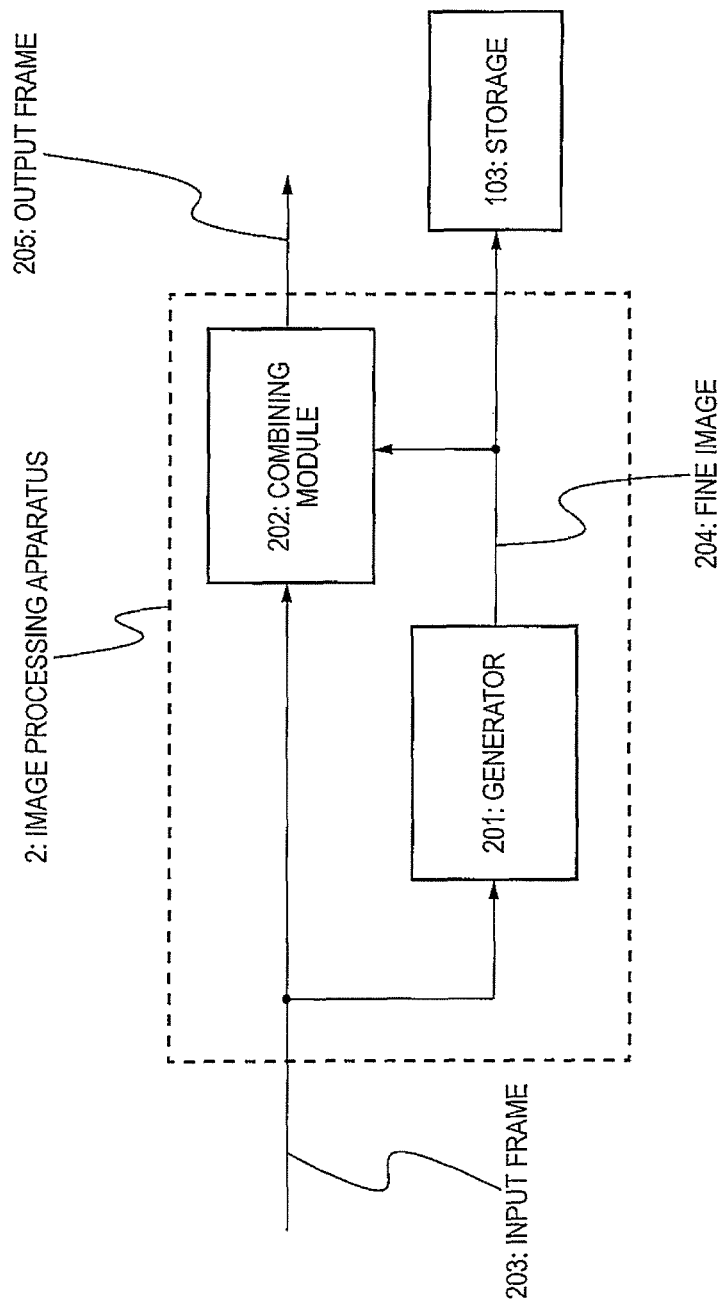
FIG. 2 is a block diagram illustrating the configuration of an image processing apparatus 2 according to the embodiment of the invention.

The storage 103 stores fine images generated by processing frames of the moving image 106 using the image processing apparatus 2 illustrated in FIG. 2. The image processing apparatus 2 includes a generator 201 and a combining module 202. An input frame 203 is input to the image processing apparatus 2 that outputs an output frame 205. The generator 201 generates a fine image 204 that is a fine texture component obtained by increasing a spatial frequency of texture components included in the input frame 203. The generator 201 can use a method disclosed in JP-A-2010-211300. The combining module 202 combines the input frame 203 with the fine image 204 generated by the generator 201 to thereby generate the output frame 205. The storage 103 stores the generated fine-image 204.

The motion compensation module 1103 produces a first tentatively-generated fine image 1111 by performing motion compensation on the first fine image 1109 stored in the storage 103 according to the first motion amount 1107. In addition, the motion compensation module 1103 also produces a second tentatively-generated fine image 1112 by performing motion compensation on the second fine image 1110 stored in the storage 103 according to the second motion amount 1108. The first fine image 1109 is a fine texture component generated at the generator 201 from the past frame 1105. The second fine image 1110 is a fine texture component generated at the generator 201 from the future frame 1106.

The blending module 1104 combines the first tentatively-generated fine image 1111 and the second tentatively-generated fine image 1112 using α-blending (to be described below) to thereby produce a generated fine image 111.

Figure 3:
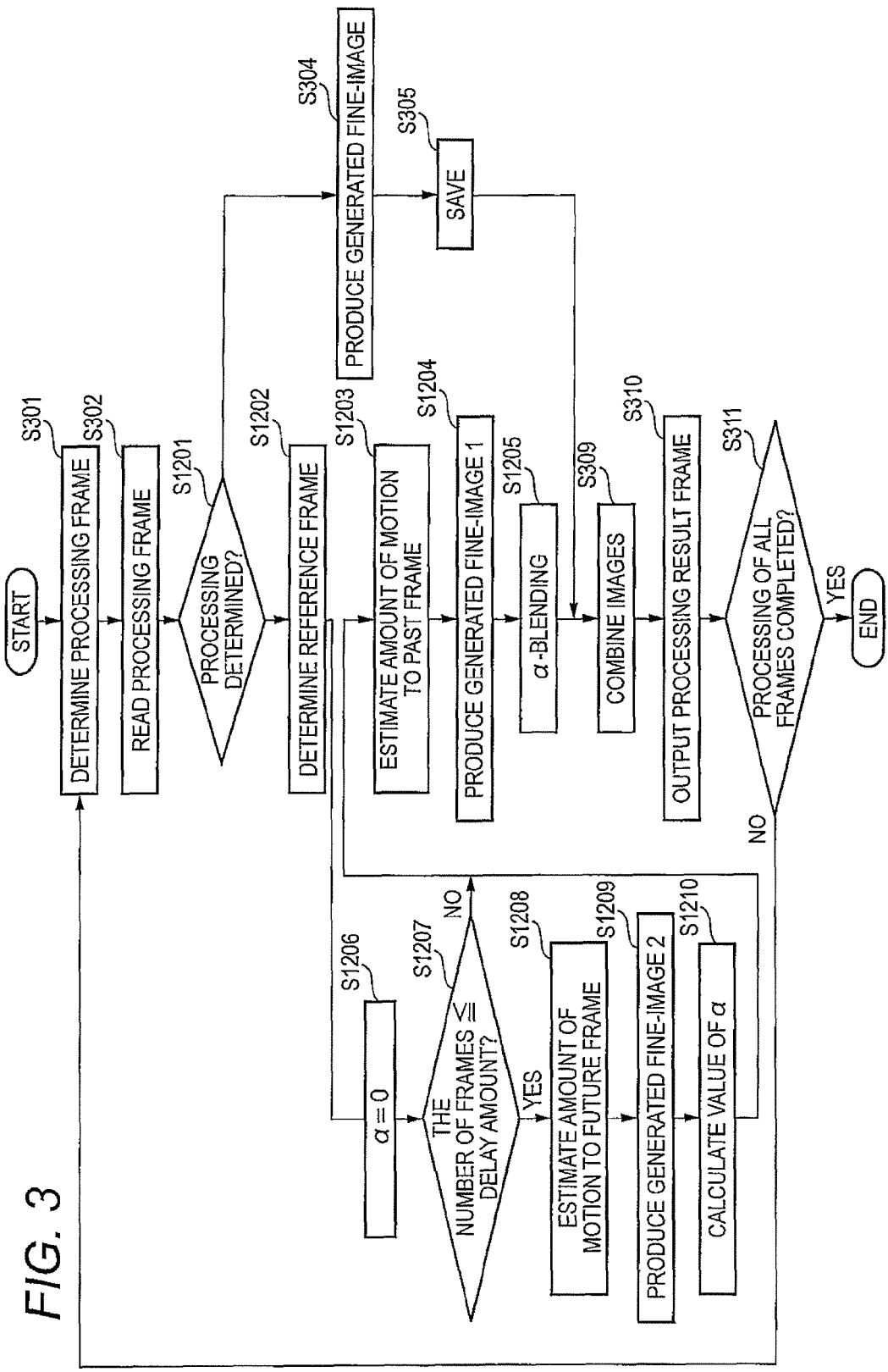
FIG. 3 is a process-flowchart illustrating a process performed by the image processing apparatus 11 according to the embodiment of the invention.

FIG. 3 is a flowchart illustrating an operation (or process) of the image processing apparatus 11.

In step S301, the processing frame 107 is determined as a processing target from the input moving image 106. A given one of unprocessed frames thereof can be selected as the processing frame. In step S302, the processing frame 107 selected in step S301 is read as image data.

In step S1201, processing to be applied to the processing frame 107 is determined. The processing includes that to be performed in the image processing apparatus 11, and that to be performed in the image processing apparatus 2. The image processing apparatus 11 is selected if at least one fine image generated from each of the frames respectively corresponding to the previous time and the later time with respect to the time corresponding to the processing frame 107 is stored in the storage 103. However, if the interval from the processing frame 107 to each of the frames respectively corresponding to the previous time and the later time is large (i.e., at least, the previous time and the later time are not the immediately prior and subsequent to the time corresponding to the processing frame 107), the image processing apparatus 2 can be selected. Alternatively, the image processing apparatuses 2 and 11 can be selected by setting a variable N for determining a cycle so that the image processing apparatus 2 is selected every kN frames (k is natural numbers), and that the image processing apparatus 11 is selected corresponding to the other frames. In this case, processing to be performed every kN frames can preliminarily be performed for all values of N.

In step S304, a fine image 204 is generated from the processing frame 107 if the image processing apparatus 2 is selected in step S1202. In step S305, the fine image 204 generated in step S304 is stored in the storage 103.

In step S1202, a past frame 1015 and a future frame 1106 are determined if the image processing apparatus 11 is selected in step S1201. The past frame is selected from the frames corresponding to the previous time prior to the time corresponding to the processing frame, among the frames from which the fine images stored in the storage 103 are generated.

The future frame is selected from the frames corresponding to the later time subsequent to the time corresponding to the processing frame 107, among the frames from which the fine images stored in the storage 103 are generated.

In step S1206, a value of 0 is set as an initial value of α for α-blending performed in step S1205.

In step S1207, a time corresponding to the future frame 1106 to be selected is compared with that obtained by adding, to the time corresponding to the processing time, a frame delay amount 1122 designated to the frame delay amount designating module 1121. If the number of frames from the processing frame 107 to the future frame 1106 is larger than the frame delay amount 1122, a motion amount to the future frame 1106 is not calculated. Then, the process proceeds to step S1203. If the number of frames from the processing from 107 to the future frame 1106 is equal to or less than the frame delay amount 1122, processing to be performed in steps S1208 and S1209 is performed.

In steps S1203 and S1208, a first motion amount 1107 serving as an amount (which is a vector-quantity hereinafter referred to as a "motion vector") of motion from the processing frame 107 to the past frame 1105, and a second motion amount 1108 serving as an amount of motion to the future frame 1106 are calculated, respectively. The motion vector can be calculated with pixel accuracy. Alternatively, the motion vector can be calculated with accuracy finer than 1 pixel (e.g., with subpixel accuracy).

Figure 4:
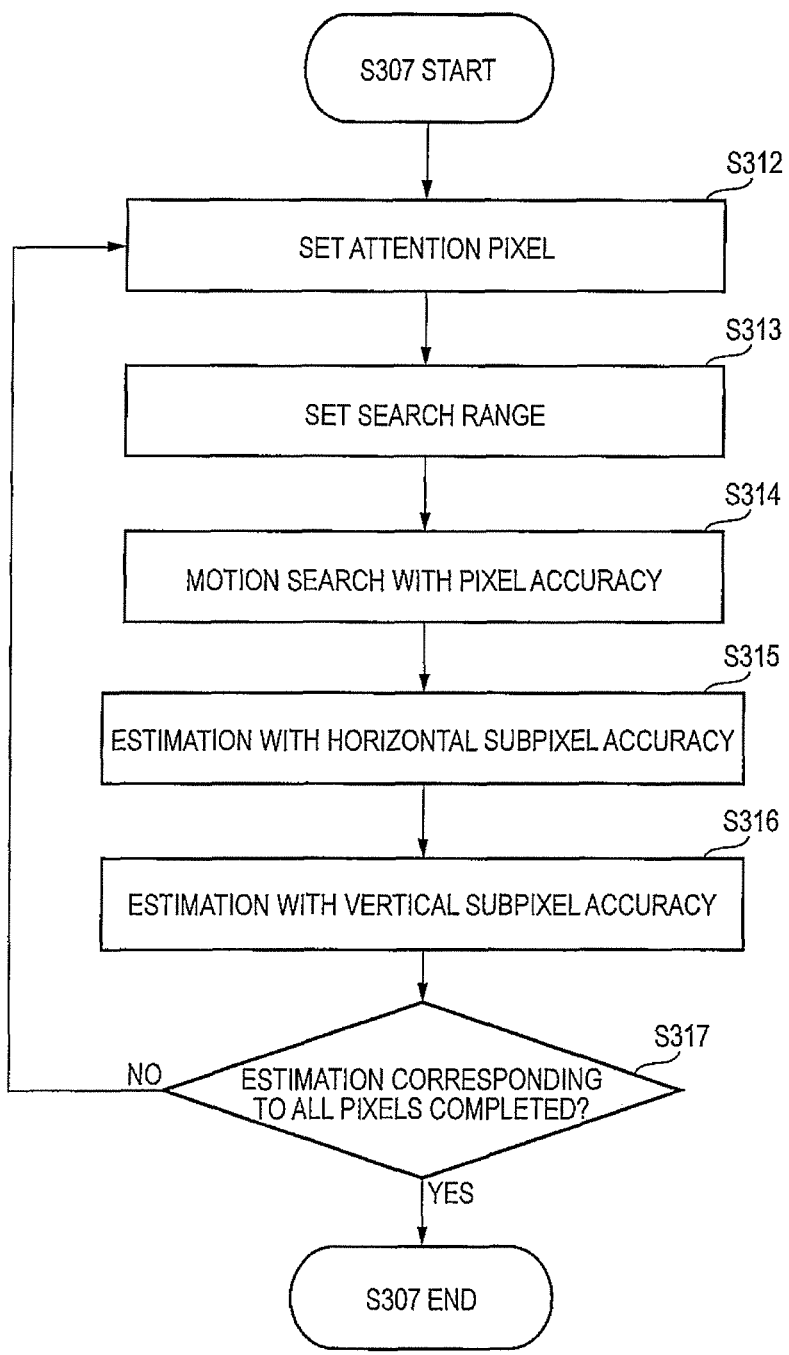
FIG. 4 is a process-flowchart illustrating a motion estimation process according to the embodiment of the invention.

Hereinafter, a method for calculating a motion vector with subpixel accuracy is described with reference to a flowchart of a subroutine 5307 illustrated in FIG. 4, which is executed in each of steps S1203 and S1208 illustrated in FIG. 3.

First, in step S312, one pixel in the processing frame 107 is set as an attention pixel P. Next, in step S313, a search range is set in a reference frame 108 around a position corresponding to the spatial position of the attention pixel P in the processing frame 107. The motion search range is, e.g., a rectangular block.

Next, in step S314, the degree of the difference in pixel-value pattern between a block centered at each pixel of the search range and that centered at the attention pixel is calculated. Hereinafter, the degree of the difference in the pixel value pattern is referred to as a matching error between the center pixels of the blocks. According to the present embodiment, the value of a sum of absolute differences (SAD value) is used as that of the matching error. Alternatively, the value of a sum of squared difference (SSD value) can be used as that of the matching error. The larger the matching error of the block centered at the pixel in the search range is, the higher the degree of the difference in pixel-value pattern from the block centered at the attention pixel. The matching error of each of the pixels in the search range is calculated. Then, the position of the pixel, at which the matching error is minimized, in the search range is determined as the pixel indicated by the motion vector with pixel accuracy. At that time, the speeding-up of such block matching can be achieved using a diamond search method in addition to the search for such a pixel among all pixels in the search range. When the motion vector is calculated with pixel accuracy, the subroutine proceeds to step S317 after the processing in step S314 is completed. When the motion vector is calculated with subpixel accuracy, the subroutine proceeds to step S315.

In step S315, a motion amount around the pixel indicated by the motion vector with pixel accuracy is calculated with subpixel accuracy according to the following method. In step S315, a horizontal motion is calculated. In a case where the coordinates of the pixel indicated by the motion vector with pixel accuracy is assumed as (x, y), a motion amount Xsub with subpixel accuracy in the horizontal direction is given by the following expression by assuming the SAD value at the coordinates (i, j) to be "SAD(i, j)", and using a method called "equiangular linear fitting".

[Expression 1]

If $SAD(x+1, y) < SAD(x-1, y)$, $$X_{sub} = \frac{SAD(x+1, y) - SAD(x-1, y)}{2(SAD(x, y) - SAD(x-1, y))}$$

Otherwise $$X_{sub} = \frac{SAD(x+1, y) - SAD(x-1, y)}{2(SAD(x, y) - SAD(x+1, y))} \quad (1)$$

In step S316, a vertical motion amount is calculated. A method for calculating the vertical motion amount is similar to the method performed in step S315. In step S317, it is determined whether the motion amount has been calculated corresponding to all of the pixels in addition to the search. If the calculation of the motion amount is not completed, the subroutine returns to step S312. If the calculation of the motion amount is completed, the processing 5307 is ended.

Turning back to the description with reference to FIG. 3, in steps S1204 and S1209, the first motion amount 1107 and the second motion amount 1108 stored in the storage 103 are read. A first tentatively-generated fine image 1111 is estimated from the first fine image 1109 and the first motion amount 1107. A second tentatively-generated fine image 1112 is estimated from the second fine image 1110 and the second motion amount stored 1108 in the storage 103. The first fine image 1109 is a fine texture component generated from the past frame 1105 at the generator 201. The second fine image 1110 is a fine texture component generated from the future frame 1106 by the generating module 201. A method for generating a fine image is similar to a process performed in step S1205 or later.

In step S1205, the first tentatively-generated fine image 1111 generated in step S1204 is combined with the second tentatively-generated fine image 1112, using the α-blending. Thus, the generated fine pixel 111 is produced. The expression (2) is an expression for performing α-blending on the pixel value "value A" at the coordinates (i, j) of an image A corresponding to the past frame, and the pixel value "value B" at the coordinates (i, j) of an image B corresponding to the future frame. Thus, the pixel value "value C" at the coordinates (i, j) in the image C corresponding to the processing frame.

[Expression 2]

$$\text{Value } C = \text{value } A \times (1-\alpha) + \text{value } B \times \alpha \quad (2)$$

In step S1210, the value of α is determined. The value of α is equal to or higher than 0, and equal to or lower than 1.0. The value of α is used as a weight in the case of using a certain measure. For example, in the case of using a time difference between the frames as the measure, the larger the time difference becomes, the smaller the value of the weight α is. That is, if the time difference between the image B and the image C is larger than the time difference between the image A and the image C, the weight α has a value of less than 0.5. In the case of using the degree of the reliability of the accuracy of the estimation of the motion amount as the measure, the larger the degree of the reliability is, the larger the set value of the weight α is. In a case where the future frame and the past frame, such as I-picture, P-picture, and B-picture, differ from each other in the degree of the reliability of the image quality, the larger the degree of the reliability of the image quality is, the larger the set value of the weight α is. A single value of α can be determined corresponding to the entire screen. Alternatively, the value of α can be determined corresponding to the individual pixels of the screen.

If the image processing apparatus 11 is selected in step S303, in step S309, a processing result frame 112 is generated by combining the generated fine-image 111 produced in step S308 with the processing frame 107. If the image processing apparatus 2 is selected in step S303, an output frame 205 is generated by combining the fine image 204 produced in step S304 with the input frame 203.

In step S310, the generated processing result frame 112 or the output frame 205 is output. In step S311, it is determined whether the processing to be performed on all frames of the moving image 106 is completed. If the processing is not completed, the process proceeds to step S301. If the processing is completed, the process is ended.

Figure 5:
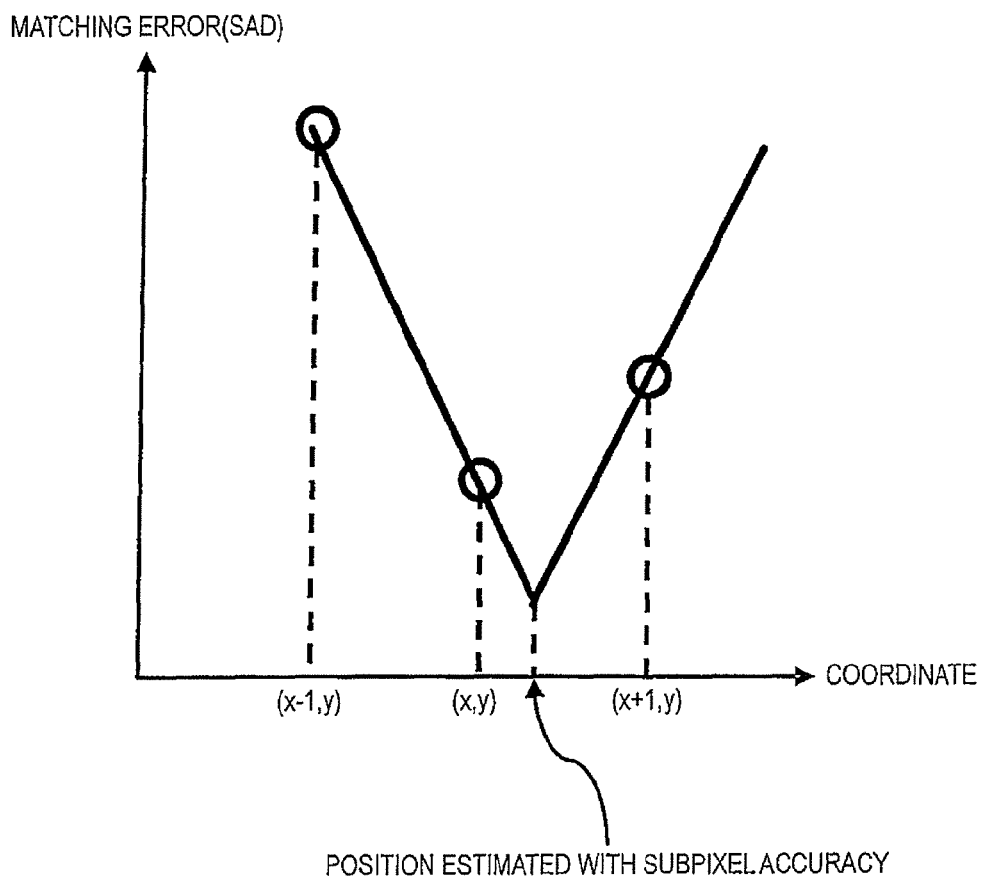
FIG. 5 is an explanatory diagram illustrating equiangular linear fitting used in the embodiment of the invention.

FIG. 5 is a schematic diagram illustrating how the estimation is performed with subpixel accuracy by equiangular linear fitting. The axis of abscissas of FIG. 5 represents the coordinates of the pixels in an image. The axis of ordinates of FIG. 5 represents the SAD value corresponding to each of the coordinates. The expression (1) represents a point of intersection of two linear segments configured to respectively have gradients which have the same absolute value, and to respectively pass through a pair of points, whose coordinates are (x−1, y) and (x, y), and another point, whose coordinates are (x+1, y), as illustrated in FIG. 5. In the case of using SSD values for the calculation of a matching error, sometimes, it is more useful to use parabola fitting, instead of the equiangular linear fitting.

In step S1207 illustrated in FIG. 3, if the time corresponding to the future frame to be selected is longer than that obtained by adding the frame delay amount 1122 designated by the frame delay amount designating module 1121 to the time corresponding to the processing frame 107, the value of α still remains "0" (α=0). Consequently, the pixel values of the first tentatively-generated fine image 1111 are used without being changed.

Figure 6:
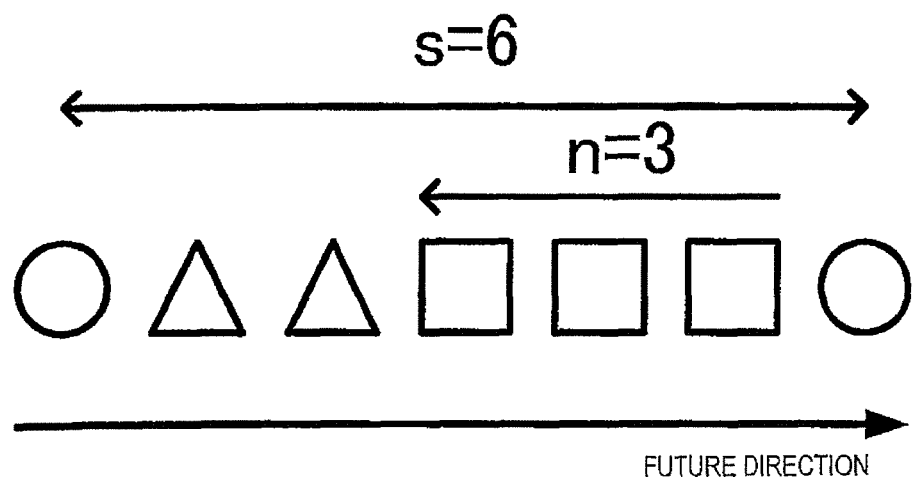
FIG. 6 is an explanatory diagram illustrating the concept of each of parameters "n" and "s" used in the embodiment of the invention.

FIG. 6 is an explanatory diagram illustrating the concepts of the parameters "n", and "s" used in the embodiment. Each circle represents a frame for generating a fine texture component every "s" frames. Each rectangle represents a frame to be processed by referring to future fine texture components the number of which is equal to or less than "n". Each triangle represents a frame that doesn't refer to future fine texture components the number of which is (s−n−1).

According to the image processing apparatus 11 of the present embodiment, the motion amount is estimated from the frames respectively prior to and subsequent to the processing frame 107. Then, the generated fine image 111 is estimated by performing weighted summation of the pixel values using the distance as a weight. Thus, advantages of suppressing a flicker with higher accuracy can be expected. In addition, the frame from which the second tentatively-generated fine-image 1112 is produced is limited to those the time corresponding to which is equal to or less than the frame delay amount 1122 from the future frame. Thus, the frame delay amount for producing the generated fine image 111 can be determined. The determination of the frame delay amount can enable the apparatus to deal with system constraint such as a buffer amount, and to control the delay to the output of an image when the image is viewed.

In the above embodiment, equi-magnification processing has been described, which is performed when the size of an input moving image is equal to that of an output moving image. However, the invention can be applied to enlargement processing to be performed when the size of an output moving image is larger than that of an input moving image.

The advantages of the apparatus or method for giving fine texture components to the image are that a flicker can be suppressed and that the processing delay can be limited to a specific value.

The present embodiment relates to image-quality enhancing method and apparatus, which convert data representing a moving image taken by a video camera, and data representing a moving image received by a television receiver into data representing a moving image having higher image quality.

According to the present embodiment, fine texture components are generated every several frames. An amount of motion of an intermediate frame from each of a past frame and a future frame from which fine texture components are generated is estimated. Then, motion compensation is performed on the fine texture components according to the amount of motion to obtain the compensated fine texture components. In addition, frames, from which fine texture components are obtained according to the amount of motion by performing motion compensation and of which the motion to the future frame is estimated and the motion compensation is performed, are limited to those the number of which is limited to a fixed number.

Advantages of the apparatus and the method are that a flicker can be suppressed, and that the processing delay can be limited to a specific value.

The technique according to the invention is that for enhancing the visual-feel of a material of a moving image by giving fine texture components to the moving image. An amount of motion of a frame from a past frame and to a future frame is estimated. Then, according to the amount of motion, fine texture components are generated. In addition, a frame to be processed by referring to the future frame is limited to those whose interval from the future frame is the specific number of frames. Thus, the display frame delay is controlled.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
an acquisition module configured to acquire a moving image configured by a plurality of frames;
an estimation module configured to estimate an amount of motion of a processing frame in the moving image with respect to a reference frame other than the processing frame in the moving image;
a fine image generator configured to produce a generated fine image serving as a fine image of the processing frame by performing, according to the amount of motion, motion compensation on a fine image by increasing a spatial frequency of texture components included in the reference frame; and
a combining module configured to combine the processing frame and the generated fine image, wherein the fine image generator puts a limit to an interval between the reference frame in a future direction and the processing frame.

2. The image processing apparatus according to claim 1, wherein:
an interval between frames, from each of which the fine image is generated, is set to s-frames;
motion compensation is performed according to an estimated amount of motion from a processing frame to a reference frame in the future direction only in a case where the number of frames from the processing frame to the reference frame in the future direction is equal to or less than n, and the limit to the interval is caused by frames of the number that is (s-n-1).

3. The image processing apparatus according to claim 1, wherein the limit to intervals is applied to frames each of which corresponds to a time subsequent to a time corresponding to the processing frame.

4. The image processing apparatus according to claim 1, further comprising:
a display module configured to display an output of the combining module.

5. An image processing method comprising:
acquiring a moving image configured by a plurality of frames;
estimating an amount of motion of a processing frame in the moving image with respect to a reference frame other than the processing frame in the moving image;
producing a generated fine image serving as a fine image of the processing frame by performing, according to the amount of motion, motion compensation on a fine image by increasing a spatial frequency of texture components included in the reference frame; and
combining the processing frame and the generated fine image by putting a limit to an interval between the reference frame in a future direction and the processing frame.

6. The image processing method according to claim 5, wherein,
an interval between frames, from each of which the fine image is generated, is set to s-frames;
motion compensation is performed according to an estimated amount of motion from a processing frame to a reference frame in the future direction only in a case where the number of frames from the processing frame to the reference frame in the future direction is equal to or less than n, and
the limit to the internal is caused by frames of the number that is (s-n-1).

7. The image processing method according to claim 5, wherein the limit to intervals is applied to frames each of which corresponds to a time subsequent to a time corresponding to the processing frame.

8. The image processing method according to claim 5, further comprising:
displaying an output of the combining module.

* * * * *